Figure 1:
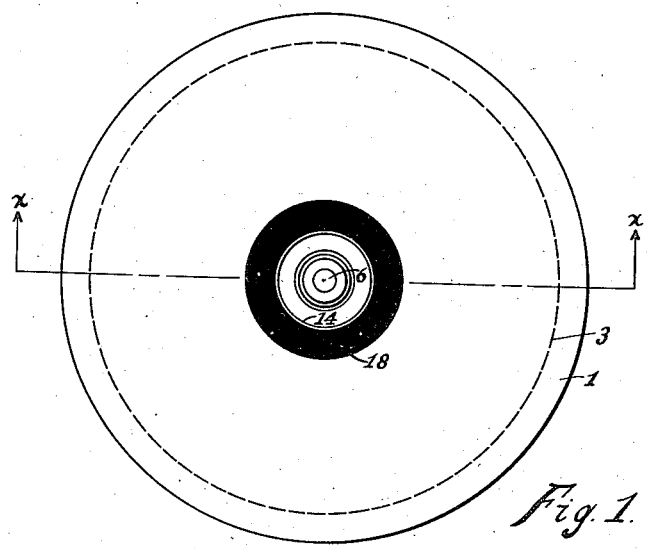

July 29, 1924.

F. R. PARKER

PROCESS OF PRODUCING UNIFORM VOLTAIC CELLS

Original Filed May 8, 1916

1,503,285

Inventor:
Frederick R. Parker.

Patented July 29, 1924.

1,503,285

UNITED STATES PATENT OFFICE.

FREDERICK R. PARKER, OF CHICAGO, ILLINOIS.

PROCESS OF PRODUCING UNIFORM VOLTAIC CELLS.

Original application filed May 8, 1916, Serial No. 96,066. Divided and this application filed December 20, 1920. Serial No. 432,027.

*To all whom it may concern:*

Be it known that I, FREDERICK R. PARKER, a citizen of the United States of America, residing at Chicago, in the county of Cook and State of Illinois, have invented a new and useful Process of Producing Uniform Voltaic Cells, of which the following is a specification, reference being had to the accompanying drawings, illustrating one form of the invention.

This application is a division of my United States patent application Serial No. 96,066, filed May 8, 1916, on voltaic cell and electrode, which issued into Patent No. 1,366,095, on January 18, 1921.

Certain features of the voltaic cell herein set forth are covered in my United States Letters Patent No. 1,182,202, dated May 9, 1916, on voltaic cell and battery, and No. 1,333,771, dated March 16, 1920, on voltaic cell and battery.

Other features of the voltaic cell herein set forth are covered in my above-mentioned parent application Serial No. 96,066, which issued into Patent No. 1,366,095, on January 18, 1921, of which this present application is a division.

A modified form of the voltaic cell herein set forth, which also embodies the present invention, forms the subject-matter of my United States patent application Serial No. 588,081, filed September 13, 1922, on voltaic cell, which is a renewal of patent application Serial No. 96,067, filed May 8, 1916, on voltaic cell, and which issued into Patent No. 1,468,574, on September 18, 1923.

The design of the voltaic cell illustrated in this application, forms the subject-matter of my co-pending United States design patent application Serial No. 427,630, filed December 1, 1920, on design for voltaic cells.

The improved high-potential electricity arrester electrodes mentioned in my above-mentioned parent application Serial No. 96,066, which issued into Patent No. 1,366,095, on January 18, 1921, of which this present application is a division, form the subject-matter of my United States patent application Serial No. 434,414, filed January 3, 1921, on high-potential electricity arrester electrode, which is a division of the said application Serial No. 96,066, and which issued into Patent No. 1,488,936, on April 1, 1924.

My invention relates to voltaic cells and batteries.

The principal objects of my invention are, to provide an improved method of constructing voltaic cells to produce uniformity therein; to provide improved means for producing voltaic cells of uniform internal resistance; to provide improved means for producing voltaic cells of uniform electrical output; to provide improved means for producing any desired internal resistance in voltaic cells; to provide improved means for producing exceedingly low internal resistances in voltaic cells; and to provide improved means for producing a high degree of efficiency in voltaic cells. Other objects will be apparent from the following disclosure of this invention.

Figure 2:
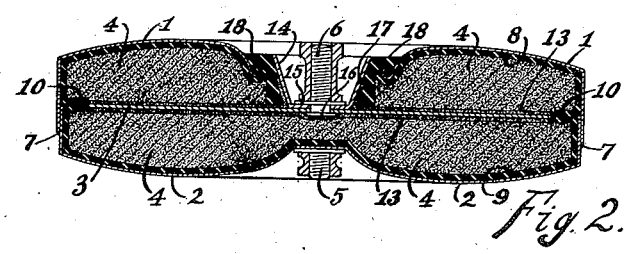
Figure 3:

On the accompanying sheet of drawings illustrating an embodiment of my invention, Figure 1 is a top or plan view of a voltaic cell constructed in accordance with the principles of the invention; Fig. 2 is a cross-sectional view of the voltaic cell of Fig. 1, taken on plane $x$—$x$ of Fig. 1, with portions shown in elevation; and Fig. 3 is an enlargement of a portion of Fig. 2, showing the preferred construction of the interior edge of the upper portion of the casing of the cell. Like characters refer to like parts in the several figures.

In the embodiment of my invention which is illustrated in the drawings, the voltaic cell has a two-part casing composed of the saucer-like portions 1 and 2, a plate-like electrode 3 disposed medially within the casing 1—2, excitant-depolarizer filling material 4 between the electrodes 1—2 and 3, and suitable terminals 5 and 6 for the respective electrodes 1—2 and 3. It will be understood that the casing 1—2 preferably constitutes one of the electrodes of the cell. In the cell illustrated, the casing 1—2 is preferably made of zinc, but it may be made of other materials also. The portions 1 and 2 of the casing are preferably formed saucer-shaped portions, one fitting into the other preferably as shown. The portions 1 and 2 are soldered together, preferably with a low-melting-point solder, at 7 around the cell, at the edge of the outer portion 1. The portions 1 and 2 of the casing are preferably lined internally with rather thick porous cardboard or soft paper, or some other suitable porous non-conducting material, 8, 9, to keep the solid matter of the filling material 4 from coming into contact with the electrode 1—2. The outer edges of the portions 8 and 9 are preferably turned inwardly against each other, around the cell, as shown at 10, to make a tight joint between the portions 8 and 9 at this place. The interior edge of the portion 1 of the casing, where a hole is provided in the casing for the terminal 6 to project out of the cell, is preferably rolled over as at 11, Fig. 3, to do away with any sharp edge thereof at this place, the interior edge 12 of the portion 8 being curved around the rolled edge 11 of the portion 1, preferably as shown in Fig. 3. The portions 8 and 9 are preferably pressed into their proper shapes to fit the portions 1 and 2 of the casing, while being manufactured. The portions 8 and 9 may be pressed from paper pulp placed into suitable dies which may be heated if desired. The portions 1 and 2 of the casing are preferably composed of curvilinear portions, preferably as shown, so as to provide curved or concave surfaces adjacent the filling material on the top, the bottom, and the sides of the cell. These curved surfaces are provided so that the casing 1—2 cannot spring, bulge, or buckle away from the filling material 4 of the cell at any portion of the casing, as it might do if it had flat surfaces. The curvilinear portions also make the casing stronger and more rigid. The terminal 5, preferably a screw post with a nut, is preferably soldered to the portion 2 of the casing as shown. This terminal 5 is preferably short and does not project out farther than the confines of the body of the cell.

The excitant depolarizer filling material 4 may be a mixture of powdered graphite or carbon, or both, with manganese-dioxide, salamoniac, and water, preferably as chemically pure as possible, or other suitable chemical mixtures.

The electrode 3 is preferably the cathode or electro-negative electrode of the cell illustrated, and in the cell illustrated it preferably comprises a metallic plate 3 covered with carbonaceous material 13 impervious to moisture, as clearly specified in my above-mentioned parent application Serial No. 96,066, which issued into Patent No. 1,366,095, on January 18, 1921, of which this present application is a division. A metallic cup-shaped portion 14 is soldered to the middle of the metallic disk 3 preferably as shown and the screw post 6 is soldered to the portion 14 at 15. The post 6 also preferably extends through the portions 14 and 3 as shown and is riveted thereto at 16. The outer edges of the metallic disk 3 are preferably rounded off to do away with sharp corners. The carbonizing covering 13 of the electrode 3 extends over the top, bottom and outer edge of the metallic disk 3, over the riveted end of the post 6 at 16, and up around the cup-shaped portion 14 as shown at 17, so that there is no possible chance of the filling material 4, or the moisture or chemical solution contained therein, coming into contact with any metal portion of the electrode member 3. The metal disk 3 provides a good conductor from all portions of the carbonizing covering 13 to the terminal post 6. My carbonized electrode 3 will not break as ordinary carbon will, and it may be made thin enough so as to be somewhat flexible. As my improved electrode 3 does not take up as much space in my voltaic cell as a carbon electrode would which would necessarily be a great deal thicker, I am enabled, by the use of my improved carbonized electrode 3, to make my voltaic cell considerably thinner than otherwise. Furthermore, with my improved carbonized electrode 3 in my voltaic cell, there is no posible chance of the electrolyte in the filling material 4 soaking its way to the terminal post 6 and thereby setting up a detrimental chemical action in the cell, as may be the case with voltaic cells in which a terminal post is connected directly to the ordinary carbon electrode.

I prefer graphite to carbon, as a carbonizing material for my electrode 3 because it is not as porous as carbon, is a better conductor of electricity, and forms a smoother and more compact covering. The graphite may also be more readily dressed down or polished than carbon. When I use graphite as the carbonizing material for my electrode 3, I also preferably use graphite in the filling material 4 of the cell. This use of graphite in my voltaic cell, together with my improved electrode 3 of higher conductivity than a carbon electrode, the large extent of surface of the electrode 1—2, and my improved method of constructing the cell, provides a voltaic cell of very low internal resistance and consequently a cell of very high amperage. With such a cell, weighing about three-fourths as much as the standard No. 6 dry cell, I have gotten more than fifty amperes of current on short-circuit as against a maximum of thirty-three amperes on short-circuit of a No. 6 dry cell on a test of a number of No. 6 cells. With my improved voltaic cell, having such a low internal resistance, the wattage loss in the cell on usage is considerably less than in the ordinary No. 6 dry cells, and consequently the wattage supplied to the external circuit is greater with my cell, and this with a cell much lighter in weight than the ordinary. I can, of course, increase the internal resistance of my cell if this is desired, in manners well understood.

The long terminal post 6 with the long nut thereon is provided on my cells for the purpose of connecting two or more of the cells together to form a battery, as set forth in my above-mentioned United States Letters Patent No. 1,182,202, dated May 9, 1916, on voltaic cell and battery.

18 is an adhesive insulating sealing material, such as pitch and glue, or some other suitable material or compound, which is heated and poured around the cup-shaped portion 14 preferably as shown, so as to tightly seal the cell between the portion 14 and the casing 1. This sealing material 18 preferably covers the rolled edge of the casing 1, shown at 11 in Fig. 3, so as to give the cell a finished appearance at this portion thereof and firmly hold the parts in their proper relative positions.

The preferred process of manufacturing my improved voltaic cell from its component parts consists of the following:—

First, the terminal 5 is preferably soldered to the portion 2 of the casing as shown. The terminal 6 has already been attached to the electrode 3 and the cup-shaped portion 14, in the manufacture of the electrode 3 as above set forth. Then the two saucer-shaped portions 1 and 2 of the casing of the cell are placed onto a table with the rims thereof projecting upwardly, and the pressed pulp-board linings 8 and 9 are placed therein, respectively. Then each of the saucer-shaped portions 1 and 2 is filled to the proper depth with the moist excitant-depolarizer material 4, preferably with the aid of a filling machine. Then the complete electrode 3 is placed onto the top of the material 4 in the portion 1 of the casing, the terminal 6 and the cup-shaped portion 14 projecting through the central opening in the portion 1. Then the exterior edges of the pulp-board linings 8 and 9 are turned over inwardly over the material 4 as shown at 10. Then the two halves of the cell are placed together as shown in Fig. 2 of the drawings, the rim of the portion 2 of the casing slipping into the portion 1 of the casing preferably as shown. Then the cell as a whole is put into a press and the halves thereof are pressed together the required amount to properly compress the filling material 4 and reduce the internal resistance of the cell to the required value, the internal resistance of the cell being measured as the pressure is applied. Then when the cell is compressed the required amount, which amount is preferably reached when the internal resistance of the cell, which is being measured as the pressure is being applied, reaches the required value, the portions 1 and 2 of the casing are soldered together, preferably at 7 clear around the cell, while the cell is held under the required pressure. Then, finally, the cell is set upright and the sealing material 18 is heated and poured into place around the cup-shaped portion 14, as shown. During the process of manufacturing the cell I preferably insert a hollow cylindrical portion of insulating material into the central opening in the portion 1 of the casing, far enough to hold the inner wall of the filling material 4 in the portion 1 in place, the cup-shaped portion 14 with its terminal 6 extending into this hollow cylindrical portion when the electrode 3 is put into place on the half 1 of the cell. This hollow cylindrical portion also serves as a guide to center the electrode 3 on the material 4 in the portion 1 of the casing.

By the process described immediately above, the cells may be very readily and easily manufactured, and may be made exceedingly uniform in resistance and electrical output. By using the proper filling material and securing the halves of the cell in compressed relation while under the proper pressure, the internal resistance of the cell may be made at any desired value, even at an exceedingly low value, and the efficiency of the cell may be made exceedingly high. My cells, constructed as above set forth, are very rigid and substantial, and are not easily damaged in handling.

Electrical conductors may be connected with the terminal posts 5 and 6 of the cell, under the nuts thereof, in a manner well understood.

I wish it to be understood that I do not desire to limit this invention to the particular details of construction, nor to the particular materials, herein set forth, as various modifications thereof may be made or utilized without departing from the scope of the appended claims.

What I claim herein as my invention is:

1. The process of constructing a voltaic cell comprising compressing the assembled cell, measuring the internal resistance of the cell while it is being compressed, to determine where the compression shall stop, stopping the compression of the cell at the proper value of its internal resistance, and permanently sealing the parts of the cell in such compressed relation while the pressure maintaining the proper value of the internal resistance is applied.

2. The process of constructing a voltaic cell comprising compressing the assembled cell, measuring the internal resistance of the compressed cell to determine where the compression shall stop, and permanently sealing the parts of the cell in compressed relation at the proper value of the internal resistance.

3. The process of constructing a voltaic cell comprising compressing the assembled cell sufficiently to reduce the internal resistance thereof to the desired value, and permanently sealing the parts of the cell in such compressed relation while the pressure is applied.

4. The process of constructing a voltaic cell comprising compressing the assembled cell sufficiently to reduce the internal resistance thereof to the desired value, and permanently sealing the parts of the cell in such compressed relation.

5. The process of constructing a voltaic cell comprising compressing the assembled cell, and permanently sealing the parts of the cell in compressed relation while the pressure is applied.

6. The process of constructing a voltaic cell comprising compressing the assembled cell, and permanently sealing the parts of the cell in compressed relation.

7. The process of constructing a voltaic cell comprising constructing the halves of the cell, placing the halves together and compressing the whole, measuring the internal resistance of the cell while it is being compressed, to determine where the compression shall stop, stopping the compression of the cell at the proper value of its internal resistance, and permanently sealing the halves of the cell together in such compressed relation while the pressure maintaining the proper value of the internal resistance is applied.

8. The process of constructing a voltaic cell comprising constructing the halves of the cell, placing the halves together and compressing the whole, measuring the internal resistance of the compressed cell to determine where the compression shall stop, and permanently sealing the halves of the cell together in compressed relation at the proper value of the internal resistance.

9. The process of constructing a voltaic cell comprising constructing the halves of the cell, placing the halves together and compressing the whole sufficiently to reduce the internal resistance of the cell to the desired value, and permanently sealing the halves of the cell together in such compressed relation while the pressure maintaining the proper value of the internal resistance is applied.

10. The process of constructing a voltaic cell comprising constructing the halves of the cell, placing the halves together and compressing the whole sufficiently to reduce the internal resistance of the cell to the desired value, and permanently sealing the halves of the cell together in such compressed relation.

11. The process of constructing a voltaic cell comprising constructing the halves of the cell, placing the halves together and compressing the whole, and permanently sealing the halves of the cell together in compressed relation while the pressure is applied.

12. The process of constructing a voltaic cell comprising constructing the halves of the cell, placing the halves together and compressing the whole, and permanently sealing the halves of the cell together in compressed relation.

As inventor of the foregoing I hereunto subscribe my name, this 14th day of December, 1920.

FREDERICK R. PARKER.